US005806608A

United States Patent [19]

DuBois

[11] Patent Number: 5,806,608

[45] Date of Patent: Sep. 15, 1998

[54] AIR-DRIVEN POST DRIVER

[76] Inventor: Johnny DuBois, 27263 Abbott Stewart Rd., Holden, La. 70744

[21] Appl. No.: 800,789

[22] Filed: Feb. 14, 1997

[51] Int. Cl.$^6$ .............................. B23B 45/16; B25D 9/14

[52] U.S. Cl. ............................ 173/90; 173/114; 173/136

[58] Field of Search .............................. 173/90, 91, 136, 173/135, 138, 114, 133, 206, 132

[56] References Cited

U.S. PATENT DOCUMENTS

| | | | |
|---|---|---|---|
| 542,498 | 7/1895 | Rinsche | 173/136 |
| 1,119,198 | 12/1914 | Smith | 173/136 |
| 1,654,833 | 1/1928 | Rice, Jr. | 173/136 |
| 2,392,061 | 1/1946 | Pfeiffer | 173/90 |
| 3,736,843 | 6/1973 | Leibundgut | 91/234 |
| 4,550,784 | 11/1985 | Ottestad et al. | 173/114 |
| 4,632,190 | 12/1986 | Mikiya | 173/133 |
| 4,658,901 | 4/1987 | Alexander | 173/91 |
| 4,984,640 | 1/1991 | Gillan et al. | 173/123 |

*Primary Examiner*—Scott A. Smith
*Attorney, Agent, or Firm*—Joseph N. Breaux

[57] ABSTRACT

An air-driven post driver that includes a hammer assembly and a post receiving assembly. The hammer assembly includes an air-driven piston hammer slidably disposed within a cylinder bore of a cylinder body having a circumferential compressed air groove of a first groove width formed into the cylinder wall that defines the cylinder bore and an upper discharge port and a lower discharge port. The piston hammer includes an upward thrusting air passageway and a downward thrusting air passageway. The upward thrusting air passageway includes a radially oriented upward intake passageway and a longitudinally oriented upward discharge passageway. The upward discharge passageway is of a length greater than one half the length of the piston hammer. The downward thrusting passageway includes a radially oriented downward intake passageway and a longitudinally oriented downward discharge passageway having a threaded downward discharge port. The downward discharge passageway is of a length greater than one-half the length of the piston hammer.

2 Claims, 3 Drawing Sheets

FIG. 1
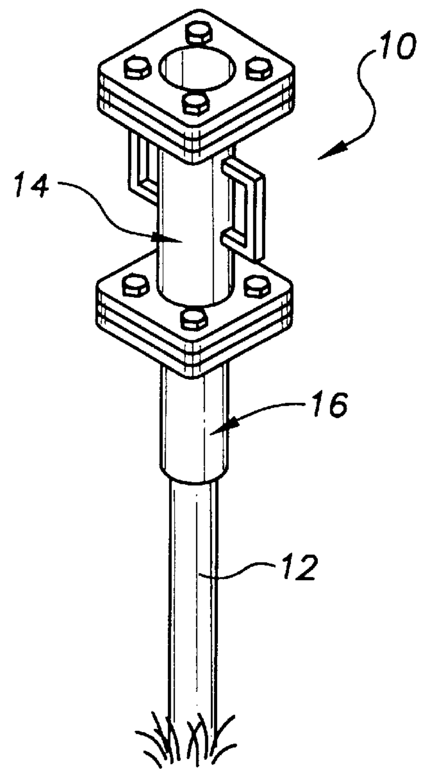
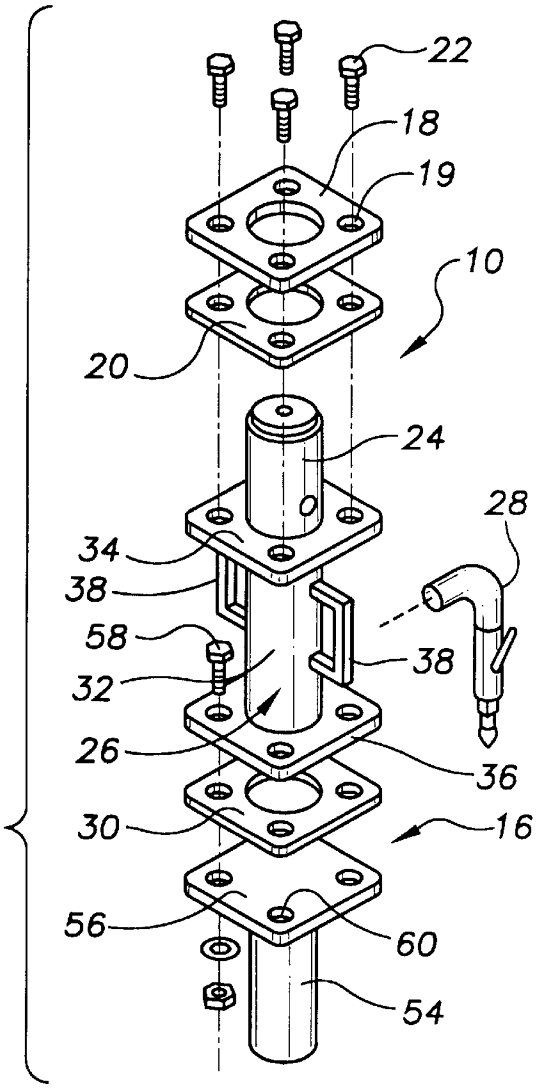
FIG. 2

AIR-DRIVEN POST DRIVER

TECHNICAL FIELD

The present invention relates to devices for driving posts into the ground and more particularly to an air-driven post driver that includes a hammer assembly and a post receiving assembly. The hammer assembly includes an air-driven piston hammer that is sealingly, slidably disposed within a cylinder bore of a cylinder body having a circumferential compressed air groove of a first groove width formed into the cylinder wall that defines the cylinder bore, an upper discharge port, and a lower discharge port. The piston hammer is of a first length and includes an upward thrusting air passageway and a downward thrusting air passageway. The upward thrusting air passageway includes a radially oriented upward intake passageway and a longitudinally oriented upward discharge passageway. The upward discharge passageway is of a length greater than one half the first length of the piston hammer. The downward thrusting passageway includes a radially oriented downward intake passageway and a longitudinally oriented downward discharge passageway having a threaded downward discharge port. The downward discharge passageway is of a length greater than one-half the first length of the piston hammer. The lengths of the downward discharge passageway and the upward discharge passageway are selected in a manner such that when the piston hammer is in a fully upward position the downward intake passageway is in communication with the circumferential compressed air groove and the upward intake passageway is not; and when the piston hammer is in a fully downward position the upward intake passageway is in communication with the circumferential compressed air groove and the downward intake passageway is not. The upper and lower discharge ports are positioned in a manner such that the piston hammer blocks the upper discharge port prior to reaching the fully upward position and blocks the lower discharge port prior to reaching the fully downward position. The post receiving assembly is attached to the cylinder body and includes a head cylinder anvil plate and a post end receiving tube.

BACKGROUND OF THE INVENTION

Driving posts into the ground can be a labor intensive job. It would of course be a benefit to have a mechanical device that could be placed over the upwardly directed end of a post to be driven into the ground that would provide a hammering force to the upwardly directed end of sufficient force and frequency to drive the downwardly directed post end into the ground to the desired depth. Because posts must often be driven into the ground at remote locations, such as when erecting fences and the like, it would be a further benefit to have a post driving device that was lightweight. In addition, because the posts must be driven in locations where fire can be a problem, it would be a further benefit to have a post driving device that could be automatically operated from a supply of a compressed gas to eliminate the use of internal combustion engines and the fire hazards associated therewith.

SUMMARY OF THE INVENTION

It is thus an object of the invention to provide an air-driven post driver that can be placed over the upwardly directed end of a post to be driven into the ground that provides a hammering force to the upwardly directed end of sufficient force and frequency to drive the downwardly directed post end into the ground to a desired depth.

It is a further object of the invention to provide an air-driven post driver that is lightweight.

It is a still further object of the invention to provide an air-driven post driver that is operated from a supply of a compressed gas.

It is a still further object of the invention to provide an air-driven post driver that includes a hammer assembly and a post receiving assembly, the hammer assembly including an air-driven piston hammer sealingly, slidably disposed within a cylinder bore of a cylinder body having a circumferential compressed air groove of a first groove width formed into the cylinder wall that defines the cylinder bore, the piston hammer including an upward thrusting air passageway and a downward thrusting air passageway.

It is a still further object of the invention to provide an air-driven post driver that accomplishes some or all of the above objects in combination.

Accordingly, an air-driven post driver is provided. The air-driven post driver includes a hammer assembly and a post receiving assembly. The hammer assembly includes an air-driven piston hammer sealingly, slidably disposed within a cylinder bore of a cylinder body having a circumferential compressed air groove of a first groove width formed into the cylinder wall that defines the cylinder bore, an upper discharge port, and a lower discharge port. The piston hammer is of a first length and includes an upward thrusting air passageway and a downward thrusting air passageway. The term "sealing, slidably" is used herein to mean shaped and sized in a manner so as to be slidable with respect to the cylinder wall while being in sufficient proximity to the cylinder wall to prevent significant air passage between the cylinder wall and the outer surface of the piston hammer. The upward thrusting air passageway includes a radially oriented upward intake passageway and a longitudinally oriented upward discharge passageway. The upward discharge passageway is of a length greater than one half the first length of the piston hammer. The downward thrusting passageway includes a radially oriented downward intake passageway and a longitudinally oriented downward discharge passageway having a threaded downward discharge port. The downward discharge passageway is of a length greater than one-half the first length of the piston hammer. The lengths of the downward discharge passageway and the upward discharge passageway are selected in a manner such that when the piston hammer is in a fully upward position the downward intake passageway is in communication with the circumferential compressed air groove and the upward intake passageway is not; and when the piston hammer is in a fully downward position the upward intake passageway is in communication with the circumferential compressed air groove and the downward intake passageway is not. The upper and lower discharge ports are positioned in a manner such that the piston hammer blocks the upper discharge port prior to reaching the fully upward position and blocks the lower discharge port prior to reaching the fully downward position. The post receiving assembly is attached to the cylinder body and includes a head cylinder anvil plate and a post end receiving tube.

In use the upwardly directed end of a post to be driven into the ground is placed into the post end receiving tube and compressed air supplied to the circumferential compressed air groove. Compressed air is then supplied to either the downward or the upward intake passageway causing the piston hammer to reciprocate between the fully upward position and the fully downward position. Each time the piston hammer reaches the fully downward position a hammering force is supplied to the post end positioned within the post end receiving tube driving the downwardly directed end of the post into the ground. The air-driven post driver is maintained in operation until the post is driven to the desired depth. In a preferred embodiment the cylinder body is provided with a pair of handles to allow the operator to assist in maintaining the post end within the post end receiving tube of the post receiving assembly.

BRIEF DESCRIPTION OF DRAWINGS

For a further understanding of the nature and objects of the present invention, reference should be made to the following detailed description, taken in conjunction with the accompanying drawings, in which like elements are given the same or analogous reference numbers and wherein:

FIG. 1 is a perspective view of an exemplary embodiment of the air-driven post driver of the present invention showing the hammer assembly and the post receiving assembly.

FIG. 2 is an exploded perspective view of the exemplary air-driven post drive of FIG. 1 showing the cylinder head, the cylinder head gasket, the piston hammer, the cylinder body, the valve assembly, and the anvil plate gasket of the hammer assembly; and the post receiving tube and the anvil plate of the post receiving assembly.

DESCRIPTION OF THE EXEMPLARY EMBODIMENT

Figure 3:
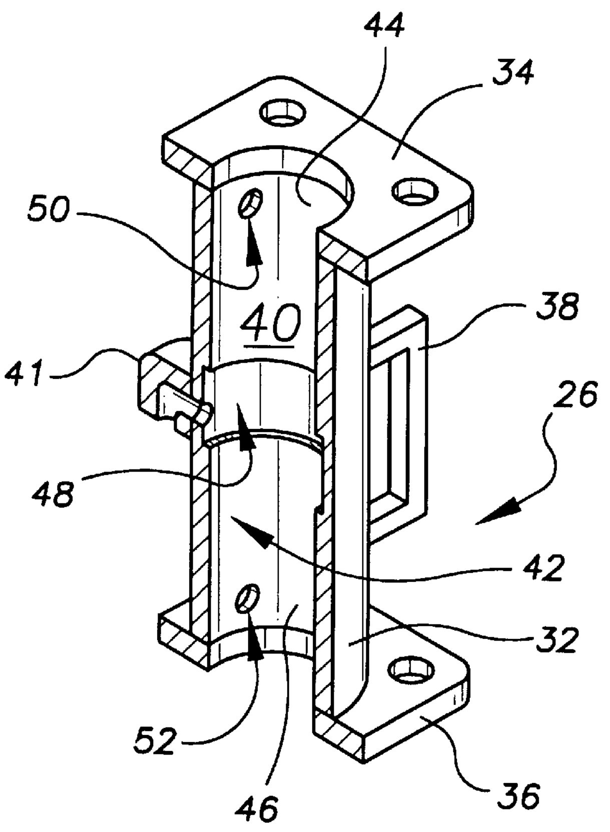
FIG. 3 is a cross-section perspective view through the cylinder body showing the upper cylinder wall, the upper discharge port, the lower cylinder wall, the lower discharge port, the circumferential compressed air supply groove, and the compressed air supply fitting.

FIG. 1 shows an exemplary embodiment of the air-driven post driver of the present invention, generally designated by the numeral 10, in use driving a representative post 12. Post driver 10 includes a hammer assembly, generally designated by the numeral 14, and post receiving assembly, generally designated by the numeral 16.

With reference to FIG. 2, hammer assembly 14 includes an upper cylinder head 18; a cylinder head gasket 20; four cylinder head bolts 22; a piston hammer 24; a cylinder body, generally designated 26; a valve assembly 28, and an anvil plate gasket 30. Upper cylinder head 18 is a rectangular section of steel plate having four bolt apertures 19 formed through the corners thereof. Cylinder head gasket 20 and anvil plate gasket 30 are conventional gaskets formed from conventional gasket material.

Cylinder body 26 is of die cast steel construction. Cylinder body 26 includes a cylinder tube 32, an upper cylinder head mounting plate 34, an anvil plate mounting plate 36, two U-shaped handles 38 and, referring now to FIG. 3, a compressed air fitting 41. Cylinder tube 32 has an internal cylinder bore 40 defined by a cylinder wall, generally designated by the numeral 42. Cylinder wall 42 is divided into an upper cylinder wall section 44 and a lower cylinder wall section 46 by a circumferential compressed air supply groove 48 formed into cylinder wall 42 around the midline of cylinder tube 32. Compressed air supply groove 48 is in connection with compressed air supply fitting 40. An upper discharge port 50 is provided through upper cylinder wall section 44. A lower discharge port 52 is provided through lower cylinder wall section 46.

Referring back to FIG. 2, post receiving assembly 16 includes a post receiving tube 54, an anvil plate 56, and four identical anvil plate securing bolt assemblies 58 (only one shown). In this embodiment anvil plate 56 is a substantially rectangular section of sheet steel having four securing apertures 60 (only three shown) provided in the corners thereof. Post receiving tube 54 is a length of steel pipe having the desired diameter for the posts to be driven. In this embodiment post receiving tube 54 is welded to one side of anvil plate 56 to form a permanently formed post receiving assembly 16.

Figure 4:
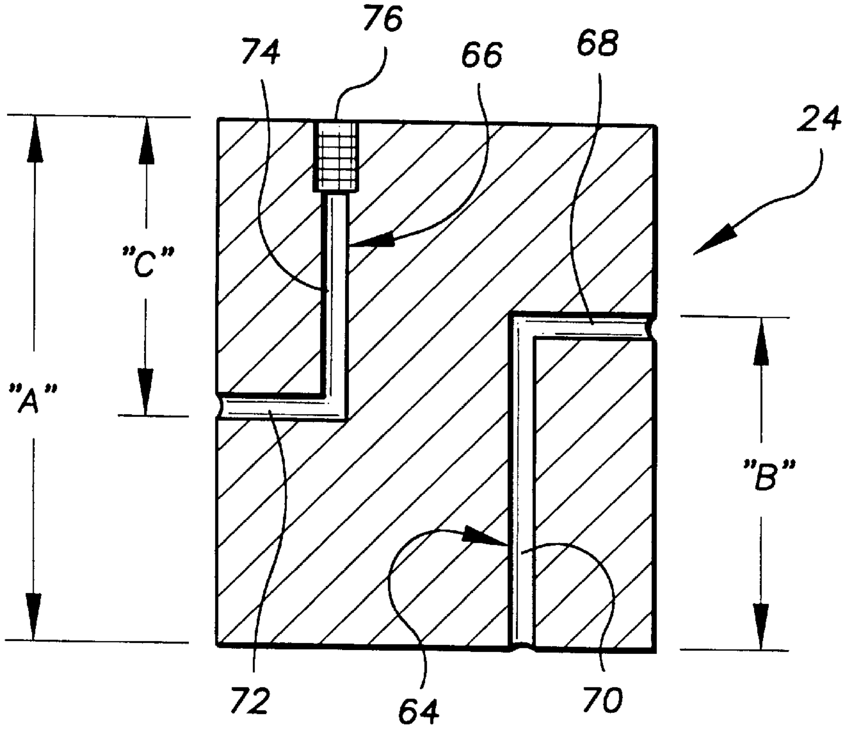
FIG. 4 is a cross-section plan view through the piston hammer showing the upward thrusting air passageway with the radially oriented upward intake passageway and the longitudinally oriented upward discharge passageway and the downward thrusting passageway including radially oriented downward intake passageway and the longitudinally oriented downward discharge passageway having a threaded downward discharge port.

Piston hammer 24 is constructed from a cylinder shaped section of stainless steel having a diameter sized to sealing slide within cylinder bore 40 (FIG. 3). Referring now to FIG. 4, piston hammer 24 has an upward thrusting air passageway, generally designated 64, and a downward thrusting passageway, generally designated 66, formed therethrough. Upward thrusting passageway 64 includes a radially oriented upward intake passageway 68 and a longitudinally oriented upward discharge passageway 70. Downward thrusting passageway 66 includes radially oriented downward intake passageway 72 and a longitudinally oriented downward discharge passageway 74. Downward discharge passageway 74 has an internal threaded downward discharge port 76. Internally threaded downward discharge port 76 is used in combination with a rod having a companionately threaded rod end to remove piston hammer 24 from cylinder bore 40 (FIG. 3) when maintenance is required.

Figure 5:
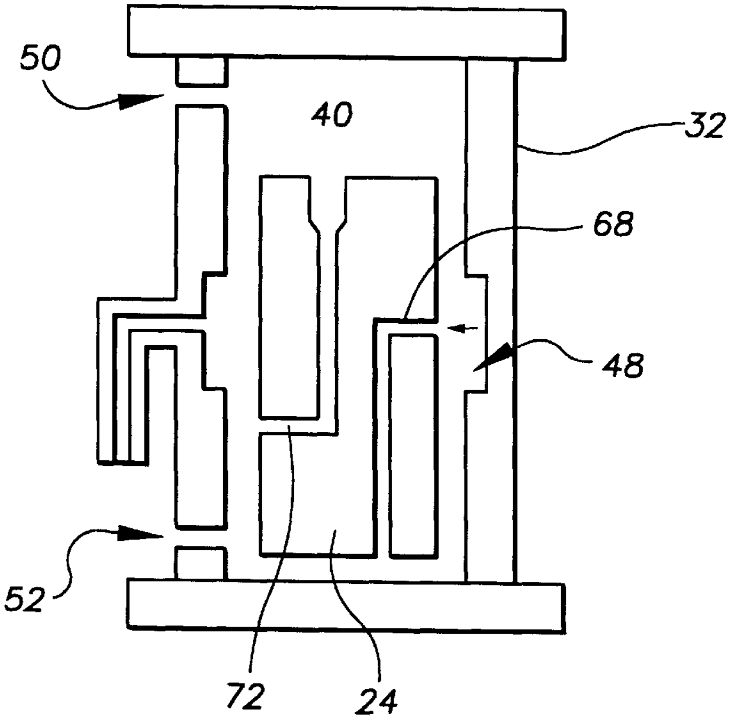
FIG. 5 is a schematic view showing the piston hammer in the fully downward position and the upward intake passageway in alignment with the compressed air supply groove. The piston hammer is spaced from the cylinder bore wall for clarity.
Figure 6:
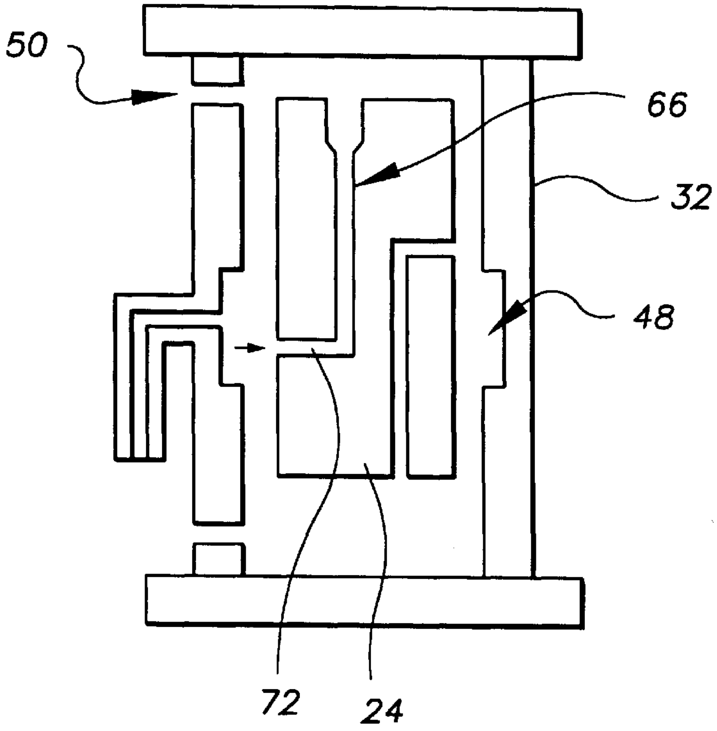
FIG. 6 is a schematic view showing the piston hammer in the fully upward position and the downward intake passageway in alignment with the compressed air supply groove. The piston hammer is spaced from the cylinder bore wall for clarity.

In this embodiment, piston hammer 24 is of a first length "A" of five inches. Upward discharge passageway 70 is of a length "B" greater than one half the first length "A" of piston hammer 24. Downward discharge passageway 74 is of a length "C" greater than one-half first length "A" of piston hammer 24. Lengths "B" and "C" are selected in a manner such that, with reference now to FIG. 5, when piston hammer 24 is in a fully downward position, upward intake passageway 68 is in communication with circumferential compressed air groove 48 and downward intake passageway 71 is not. When upward intake passageway 68 is in communication with compressed air groove 48 lower discharge port 52 is blocked and compressed air travels through upward thrusting passageway 64 forcing piston hammer 24 rapidly upward toward the fully upward position. Any air trapped above piston hammer 24 is rapidly forced out through upper discharge port 50 as piston hammer 24 travels upward. With reference to FIG. 6, upper discharge port 50 is blocked by piston hammer 24 just prior to piston hammer 24 reaching the fully upward position, and then downward intake passageway 72 is brought into connection with compressed air groove 48. Compressed air then travels through downward thrusting passageway 66 forcing piston hammer 24 rapidly downward. This cycle is automatically repeated for as long as compressed air is supplied to compressed air fitting 41. Each time piston hammer 24 reaches the fully downward position, post receiving assembly 16 (FIGS. 1 and 2) provides a force against a post top positioned within post receiving tube 54 forcing the post 12 gradually into the ground. In use, compressed air is supplied for a time sufficient drive the post to the desired depth. Referring back to FIG. 2, this time period is controlled by the user in this embodiment by manual operation of convention compressed air valve assembly 28.

It can be seen from the preceding description that an air-driven post driver has been provided that can be placed over the upwardly directed end of a post to be driven into the ground that provides a hammering force to the upwardly directed end of sufficient force and frequency to drive the downwardly directed post end into the ground to a desired depth; that is lightweight; that is operated from a supply of a compressed gas; and that includes a hammer assembly and a post receiving assembly, the hammer assembly including an air-driven piston hammer sealingly, slidably disposed within a cylinder bore of a cylinder body having a circumferential compressed air groove of a first groove width formed into the cylinder wall that defines the cylinder bore, the piston hammer including an upward thrusting air passageway and a downward thrusting air passageway.

It is noted that the embodiment of the air-driven post driver described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. An air-driven post driver comprising:

a hammer assembly including:

a cylinder body having cylinder wall defining a cylinder bore, said cylinder wall having a circumferential compressed air groove of a first groove width formed therein and an upper discharge port and a lower discharge port formed therethrough, said circumferential compressed air groove, said upper discharge port, and said lower discharge port each being in gas flow communication with said cylinder bore;

a cylinder shaped, air-driven piston hammer that is sealingly, slidably disposed within said cylinder bore, said piston hammer being of a first length, said piston hammer including an upward thrusting air passageway and a downward thrusting air passageway, said upward thrusting air passageway including a radially oriented upward intake passageway and a longitudinally oriented upward discharge passageway, said upward discharge passageway being of a length greater than one half said first length of said piston hammer, said downward thrusting air passageway including a radially oriented downward intake passageway and a longitudinally oriented downward discharge passageway having a threaded downward discharge port, said downward discharge passageway being of a length greater than one-half said first length of said piston hammer, said lengths of said downward discharge passageway and said upward discharge passageway being selected in a manner such that when said piston hammer is in a fully upward position said downward intake passageway is in communication with said circumferential compressed air groove and said upward intake passageway is not, and when said piston hammer is in a fully downward position said upward intake passageway is in communication with said circumferential compressed air groove and said downward intake passageway is not, said upper and lower discharge ports being positioned in a manner such that said piston hammer blocks said upper discharge port prior to reaching said fully upward position and blocks said lower discharge port prior to reaching said fully downward position; and a post receiving assembly that is attached to said cylinder body, said post receiving assembly including a head cylinder anvil plate and a post end receiving tube, said post end receiving tube having a post receiving cavity sized to receive an upwardly directed end of a post to be driven.

2. The air-driven post driver of claim 1, wherein:

said post receiving tube is a length of steel pipe that is welded to one side of said anvil plate.

* * * * *